Patented June 26, 1934

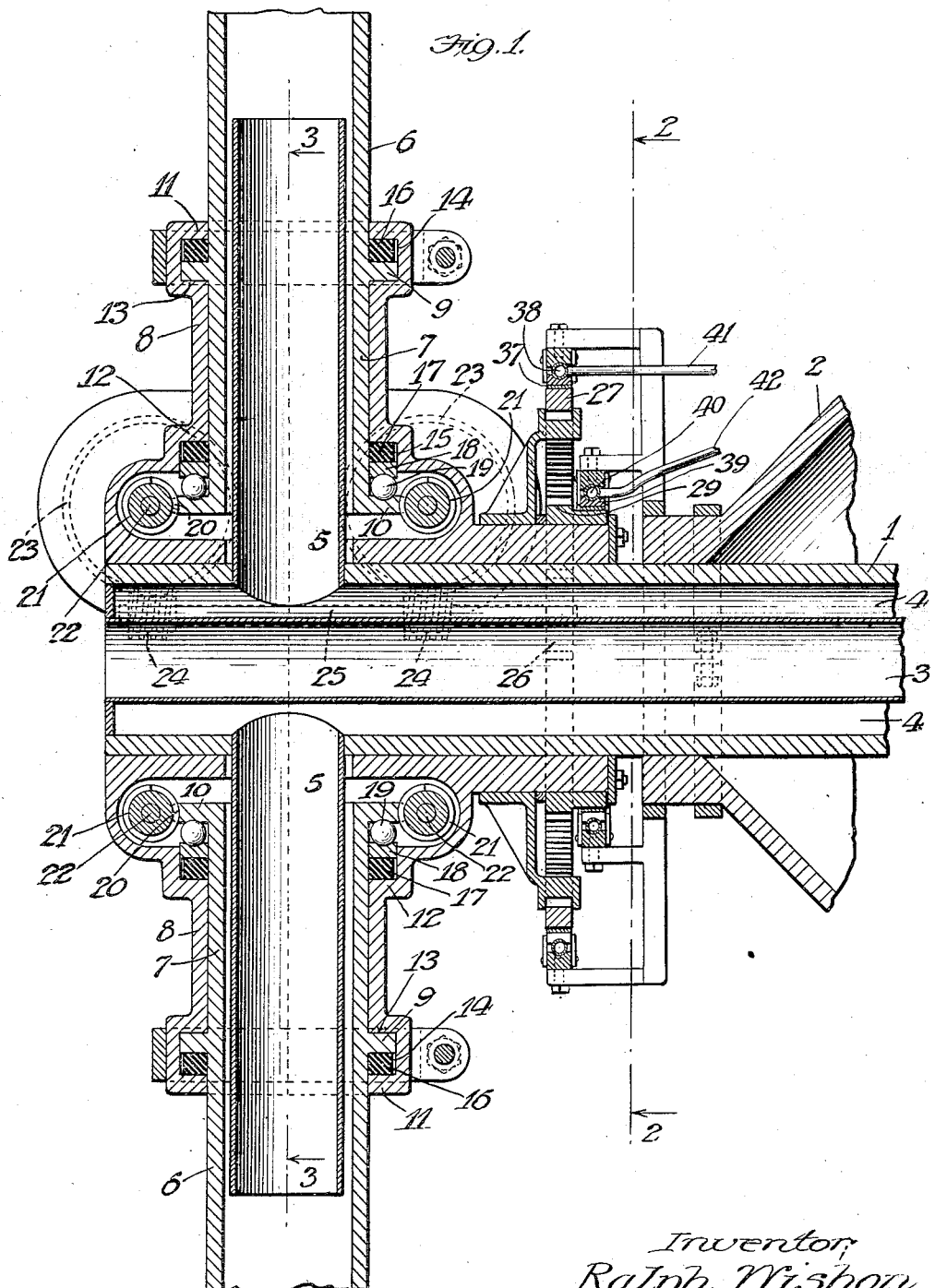

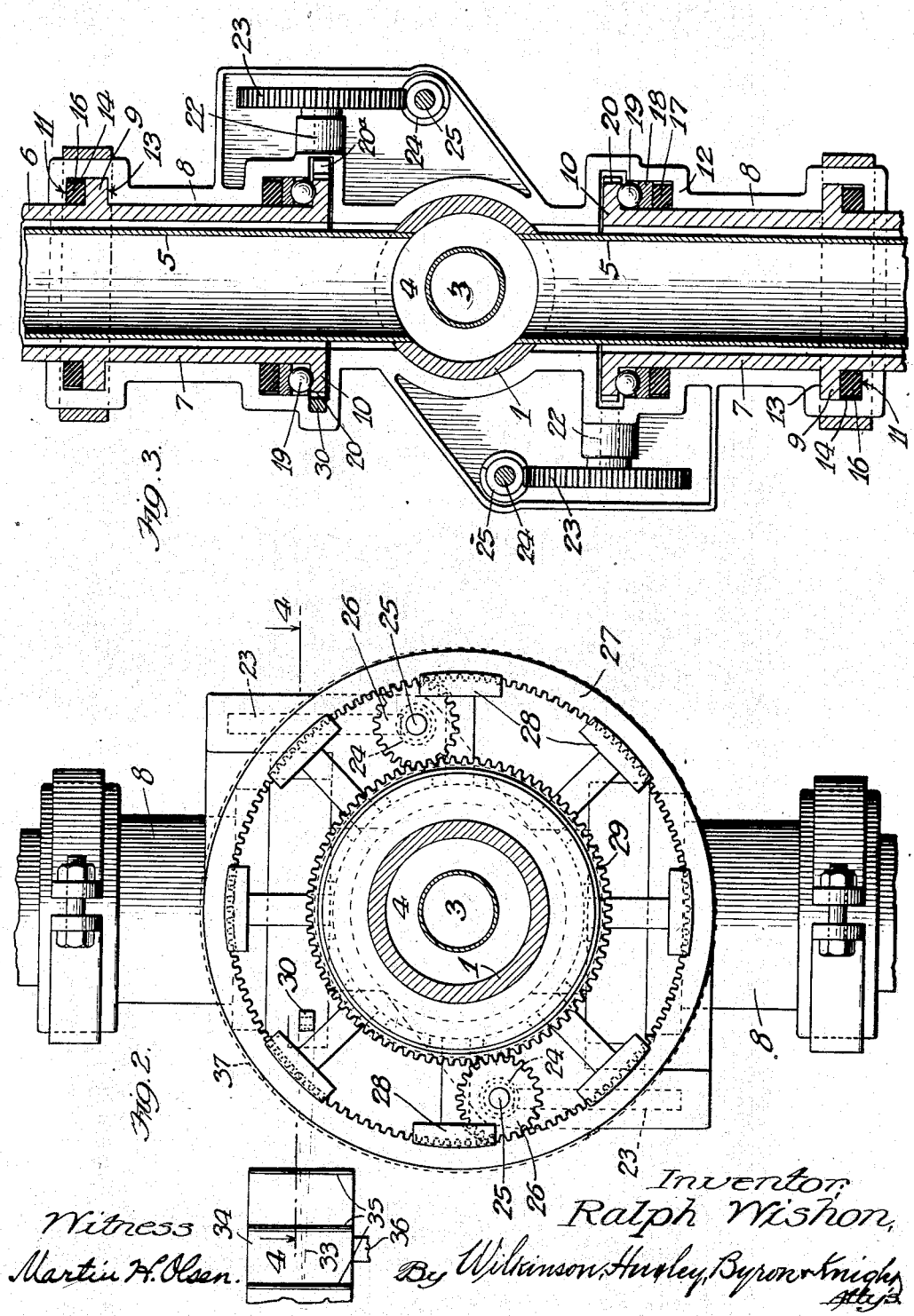

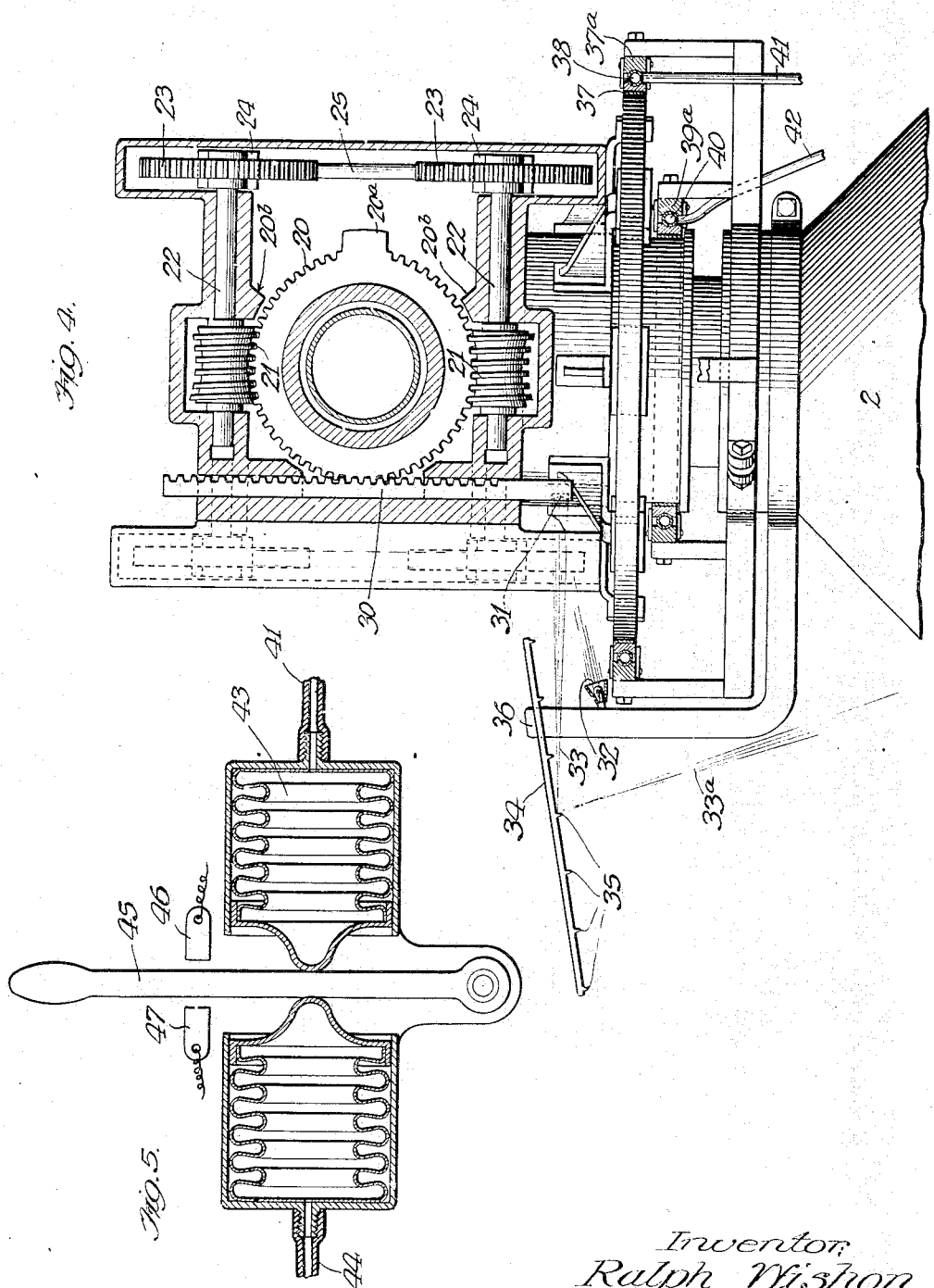

1,964,102

UNITED STATES PATENT OFFICE 1,964,102

VARIABLE PITCH AND REVERSIBLE AEROPLANE PROPELLER

Ralph Wishon, San Francisco, Calif., assignor to Bendix Research Corporation, East Orange, N. J., a corporation of Indiana Application December 17, 1927, Serial No. 240,676

19 Claims. (Cl. 170—163)

This invention relates to propellers for aeroplanes, and particularly to propellers which are mounted for controllable rotation about axes radial to the propeller shaft and combined with means for imparting such rotation, at will, through angles which will have the effect of modifying the driving force of the propeller, for instance, when it is desired to get a more rapid take-off or climb or a presentation of the blades which will be sufficient to completely reverse the action of the propeller, for instance, when it may be desired to decelerate the progress of the plane and accomplish a quicker stop.

One object of the invention is to so mount the blades of the propeller that while permitted to rotate under the drive of positive adjusting means, they will, when revolving at efficient speed, automatically lock themselves against rotation in their mountings and thus avoid vibration or chattering of the blades or strains upon the means employed for adjusting them; and, to this end, one feature of the invention consists in mounting each blade in the propeller hub through means of a cylindrical shank fitted to a hub socket and carrying annular external flanges on the shank overlapping shoulders in the sockets of the hub so as to limit inward as well as outward axially movement of the blade in the hub; the shoulders which limit outward movement of the blades in the hubs, however, being spaced from the flanges on the shanks a distance sufficient to admit frictional locking means in the form of resilient deformable material, preferably rubber, which, under pressure of the blade flange developed by centrifugal force, will so completely fill the space as to frictionally lock the blade against turning in the hub socket whenever the propeller is revolving at an efficient speed, but will reinquish frictional binding effect sufficiently to permit the blade to respond to positive adjusting force whenever the propeller speed is reduced materially below efficient driving speed, and even though it be still driven at a speed which will be sufficient to maintain headway and dirigibility.

Another object is to provide a simple and efficient means for imparting rotary adjustment to the blades in the hub, at will; and, to this end, another feature consists in providing a worm gear drive for each blade, these worm gear drives being preferably multipled into a dual worm gear drive for each propeller blade, namely, a first worm wheel driving unit, the worm wheel of which is incorporated in the construction of the blade, for instance, by forming it on the periphery of one of the limiting flanges, and a second worm drive unit, the worm wheel of which is carried by the shaft of the worm of the first driving unit, the advantage of a dual worm drive of this kind, in addition to the very large reduction in the motion transmitted and consequent increase of power, being that it facilitates directing the transmission of blade shifting force from a point of convenient manual control first to the means automatically taking off power from the propeller shaft to the adjusting means, thence through the second worm drive longitudinally of the shaft to the vicinity of the radial plane of the propeller blades, and thence transversely of the radii of the propeller blades to the worm wheel which is on the blade.

Another object is to provide a simple and reliable means whereby power may be derived from the revolving propeller to angularly shift the propeller blades; and, to this end, another feature of the invention consists in having the worm shaft of the second worm drive unit equipped with a pinion which meshes with each of two concentric rings, toothed respectively interiorly and exteriorly, and revolubly mounted upon the propeller hub so that they are normally free to revolve with the propeller and avoid influencing the propeller adjusting pinion, but each adapted to have its rotation arrested at will through means of an appropriate braking device under control of the pilot so that when braking force is applied to either toothed ring, the drag or arrest resulting therefrom will rotate the second worm operating pinion as the latter travels over the surface of the arrested ring, and thereby imparts adjustment to the propeller blades; the adjustment being in one direction if the outer ring is arrested, and in the opposite direction if the inner ring is arrested. And a subordinate object incident to this part of the invention is to provide a simple and efficient means whereby braking resistance may be applied to either ring at will to cause the said retardation or arrest, to which end, another feature of the invention consists in associating with each ring a brake band or shoe adapted to be pressed into frictional bearing upon the ring by a resilient expansion tube interposed between the braking member and a backing member, which latter is supported by means of brackets or otherwise upon a non-rotating portion of the apparatus, said resilient tube being supplied with pressure fluid through a pipe leading from a suitable pump, for instance, the well known collapsible diaphragm metallic bellows.

Some suitable means are provided whereby the extent of adjustment of the propeller blade is rendered observable at all times.

In order that the invention may be fully understood, the preferred embodiment thereof is shown in the accompanying drawings, in which—

Figure 1 is an axial section of the propeller shaft of an aeroplane in the plane of the blades, together with parts appurtenant thereto, including fragments of the propeller blades and mechanism embodying the subject-matter of the present invention.

Figure 2 is a section on the line 2—2 of Figure 1, showing in detail the means for automatically generating adjusting movement by the power of the revolving propeller.

Figure 3 is a section transverse to the propeller shaft and in the plane of the axes of the blades, showing mounting details of the mounting of the blades which renders them rotatable, and parts of the mechanism from which the blades receive rotary adjustment.

Figure 4 is a section in a plane parallel with the axis of the propeller shaft, but removed therefrom, to-wit, a plane which includes the axes of the shafts of the worms which intermesh with the circular rack on a propeller blade; other parts, including the adjustment indicator, being shown in plan.

Figure 5 is a detail view showing a suggested form of device, to-wit, a collapsible diaphragm pump suitable for bringing into play the means whereby propeller motion is made available for adjusting the propeller blades.

1 represents the propeller shaft of an aeroplane extending beyond the engine housing 2, which shaft, in addition to being equipped with the usual gun tube 3 is preferably made with an internal chamber 4 that communicates with engine exhaust pipes 5, which latter are coaxial with the propeller blades. 6 represents inner portions of the propeller blades, the outer portions of which are omitted, but which are to be understood as following some approved design, and which preferably will embody the known feature of permitting engine gases to be exhausted through them; and these propeller blades are provided with shanks 7 through which they are rotatably mounted in sleeve-like sockets 8 forming parts of the propeller hub and limited in movement in the direction of the axis of the blades, in said sockets, by means of annular flanges 9 and 10 on the blade shanks confined against outward movement by shoulders 11 and 12 of the sockets and against inward movement by shoulders 13. Shoulders 13 and 11 are spaced apart sufficiently to provide chambers 14 in which are located resilient deformable bodies 16, preferably of rubber, in position between the flanges 9 and shoulders 11. Similar bodies 17 of rubber or its equivalent are located in chambers 15 between the flanges 10 and the shoulders 12, and these bodies react under the centrifugal force of the blades to completely fill the chambers 14 and 15, and so press frictionally against the shank of the blade and the walls of the chamber that they rigidly lock the blades against rotary displacement when the machine is in flight, and thus relieve the adjusting mechanism from injurious stresses.

When it is desired to adjust the propeller blades to change their pitch or direction of drive while in flight, the engine is slowed down to a point where, while maintaining headway and dirigibility of the machine, the pressure of the packing bodies 16, 17 will be largely relieved by the drop in centrifugal force incident to reduced speed, and adjustment can take place. Preferably, radial thrust of the propeller blades against the inner packing body 17 will be imparted through means of raceways 18 and anti-friction balls 19.

For the purpose of imparting voluntary rotation to the blades 6, flanges 10 are designed with annular racks 20, each of which receives a pair of drive worms 21 located at diametrically opposite points thereof and exteriorly so as to develop greatest power over the blades, and these worms 21 are mounted on shaft 22 which extends tangentially of the racks 20, as best seen in Fig. 4, to driving pinions 23 keyed to their remote ends, which in turn are driven by a second pair of worms 24 shown in dotted lines near the center of Fig. 1 and in full lines in Fig. 3, thus developing in the worm drives 20, 21 greatly multiplied power and reduced amplitude of movement.

Shafts 25 of worms 24, as suggested in dotted lines near the center of Fig. 1, extend to pinions 26 shown in full lines in Fig. 2, where they occupy the annular space between an outer circular rack 27, which is rotatably supported concentrically by the propeller hub through any suitable means, for instance, radial brackets 28, and an inner circular rack 29 which is rotatably supported by direct concentric bearing upon the propeller hub.

The organization of parts thus far described, to-wit, the propeller shaft, its hub, the radially disposed blades rotatable upon their own axes but located securely against such rotation by the compressible packings and double trains of worm gears, and the circular racks 27, 29 driven without relative movement by the pinions 26, will all move in fixed relation one to another under the normal functioning of the propeller. But if either one of the racks 27 and 29 is arrested or even retarded in its revolution, for instance, by imposing a braking effect or drag upon a rack, the pinions 26, whose shafts are journaled in bearings fixed on the propeller hub, will travel upon the surface of the restrained circular rack and cause rotation to develop in the said pinions, which is transmitted through shafts 25 and worms 24 to pinions 23, and thence through shafts 22 and worms 21 to the racks 20 by the propeller blades, thereby imparting rotary adjustment of pitch or presentation to the said blades. If the outer circular rack 27 is retarded or arrested, the angular adjustment of the propeller blades will be in one direction, for instance, in the direction to lessen the pitch of the propeller blades, whereas if the outer circular rack 27 is left free to revolve and the inner circular rack 29 is arrested or retarded, and the pinions 26 are caused to travel over it while meshing with it, rotary adjustment in the propeller blades will be developed in the opposite direction, for instance, in the direction to increase the pitch. The range of movement of the propeller blades may be limited through means of a lug 20a (Fig. 4) bringing up against one or the other of the shoulders 20b.

It is to be understood that the proportioning of the parts contemplates an angular adjustment of the propeller blades sufficiently to develop a presentation that will cause displacement of the air in the direction of flight and thereby retard progress of the machine in case it be desirable to land on a restricted runway, as well as minor adjustments which would have merely the effect of changing the pitch and consequent climbing power of the propeller.

For the purpose of similarly demonstrating to the pilot the extent of rotary adjustment of the propeller blades, a rack bar 30, shown in Figures 2 and 4, slidably mounted tangential to the circular rack 20 of one of the propeller blades and having teeth meshing therewith, is equipped at its exposed inner end with a mirror 31 within the range of illumination of a light source 32 and with an angle of reflection relatively to said light source which causes it to direct a light beam 33 toward a scale or gauge 34, the graduations of which consist of raised reflecting faces 35 which, respectively, receive the light beam reflected by the mirror 31 in the different positions which the latter assumes as a result of adjustment of the propeller blade. That is to say, the reflecting scale or gauge 34 is fixed in position, for instance, by mounting it upon a bracket arm 36 in such position approaching parallelism with the arm 33 that its raised reflecting faces 35, spaced at intervals thereon which render them readily distinguishable by the pilot viewing the beam 33a reflected therefrom, will severally receive and reflect the beam 33 under relatively slight movements of the mirror 31, and the pilot can readily call into play the automatic or self adjusting action of the propeller until the point of reflection of beam 33, 33a from the gauge 34 shows the blades to be in the positions of adjustment desired.

For the purpose of calling into play the automatic adjustment of the propeller blades, namely, by retarding one or the other of the circular racks 27, 29 at will, said racks are provided with brake shoes 37 and 39 adapted to be pressed into frictional bearing upon the said racks by means of annular flexible pressure chambers 38, 40, sustained by fixedly mounted packing members 87a, 39a, which are subject to inflation by a fluid pressure medium forced into them through pipes 41, 42 from any controllable source of pressure, such, for instance, as the collapsible diaphragm pumps 43, 44 with their controlling lever 45, as shown in Figure 5.

Lever 45 is made the means of also glowing the light source 32, as by placing in the path of movement of said lever, in either direction, electric terminal 46 or 47 introduced into the light circuit.

An important feature of the present invention, among others, resides in the fact that the means for imparting angular adjustment to the blade, consists of two non-retroactive driving units en train, which translate the actuating force into one of greatly reduced amplitude of movement and correspondingly enlarged power, so that the blades can be adjusted very accurately.

I claim:

1. In an adjustable blade propeller, a propeller blade mounted for rotation about an axis radial to the propeller and constructed with an external circular rack, a pair of drive worms related externally to and meshing with said rack, shafts carrying said worms and extending in directions transverse to the axis of the propeller, a third shaft driving the shafts first named and extending parallel to the axis of the propeller, and means for imparting rotation to said third shaft; the two shafts first named having upon their ends remove from the said drive worms gear wheels in driving relation to them, and said third shaft having drive worms through which it engages and drives said gear wheels.

2. In an adjustable blade propeller, a blade mounted for angular adjustment about an axis radial to the propeller and having a circular external rack, a pair of worms related tangentially to said rack, a pair of shafts for carrying said worms and extending in a direction transverse to the axis of the propeller, gear wheels on said shafts, a pair of worms rotatable about axes parallel with the propeller shaft, meshing with said gear wheels, and rotating them in unison, a third shaft carrying the second named pair of worms, and a single gear wheel mounted on said third shaft and adapted to impart rotation through the several worm drives to the propeller blade.

3. In an adjustable blade propeller, a blade mounted for rotation about an axis substantially radial to the propeller, a train of gears imparting rotation to said blade, including a shaft extending parallel to the axis of the propeller, a pinion on said shaft, and means for rotating said shaft and pinion in opposite directions at will, including internal and external concentric circular racks both meshing with said pinion.

4. In an adjustable blade propeller, a blade mounted for rotation about an axis substantially radial to the propeller, a train of gears imparting rotation to said blade, including a shaft extending parallel to the axis of the propeller, a pinion on said shaft, and means for rotating said shaft and pinion in opposite directions at will, including internal and external concentric circular racks both meshing with said pinion, said shaft, pinion, and racks normally revolving with the propeller, and means for retarding the revolution of either rack at will.

5. In an adjustable blade propeller, a blade mounted for rotation about an axis substantially radial to the propeller, a train of gears imparting rotation to said blade, including a shaft extending parallel to the axis of the propeller, a pinion on said shaft, and means for rotating said shaft and pinion in opposite directions at will, including internal and external concentric circular racks both meshing with said pinion; said shaft, pinion, and racks normally revolving with the propeller, and means for retarding the revolution of either rack at will; the last named means comprising friction brakes adapted to the respective racks, and means for applying said brakes at will.

6. In an adjustable blade propeller, a blade mounted for rotation about an axis substantially radial to the propeller, a train of gears imparting rotation to said blade, including a shaft extending parallel to the axis of the propeller, a pinion on said shaft, and means for rotating said shaft and pinion in opposite directions at will, including internal and external concentric circular racks both meshing with said pinion; said shaft, pinion, and racks normally revolving with the propeller, and means for retarding the revolution of either rack at will; the last named means comprising friction brakes adapted to the respective racks, and means for applying said brakes at will comprising an expansible fluid chamber suitably sustained and bearing upon each friction brake, and means for forcing a fluid pressure medium into either of said chambers at will.

7. In an adjustable blade propeller, a blade mounted for rotation about an axis substantially radial to the propeller axis, a train of gears imparting rotation to said blade including a shaft extending parallel to the axis of the propeller, a pinion on said shaft, means for rotating the said shaft and pinion in opposite directions at will to adjust the pitch of said blade including internal and external concentric circular racks both meshing with said pinion, and fluid pressure means for effecting operation of said racks.

8. In combination with a propeller having pitch adjustable blades, a shaft for rotating said propeller, and means for varying the pitch of said blades including a pair of internal and external concentric circular racks operatively connected to said shaft and blades, brake mechanism for holding said gears against rotation, and fluid pressure means for moving said mechanism into engagement with said gears.

9. In an adjustable blade propeller having a shaft, a hub drivably connected with said shaft, a plurality of propeller blades rotatably mounted in said hub, an external rack for each blade, a worm for each of said racks, means including a pinion for each worm for rotating the same, and a pair of concentrically arranged gears rotatably mounted with respect to the shaft, said pinions meshing with each of said gears.

10. In an adjustable blade propeller having a shaft, a hub drivably connected with said shaft, a plurality of propeller blades rotatably mounted in said hub, an external rack for each blade, a worm for each of said racks, means including a pinion for each worm for rotating the same, and a pair of concentrically arranged gears rotatably mounted with respect to the shaft, said pinions meshing with each of said gears, and brake mechanism for selectively retarding rotation of either of said concentrically arranged gears for effecting relative movement between said gears and shaft for adjusting the pitch of said blades.

11. In a reversible propeller, in combination, a propeller shaft, a propeller support on the shaft, propeller blades mounted in said support, said blades being disposed for turning about their longitudinal axes, each propeller blade having a gear and a worm for turning the same about its longitudinal axis, a pinion for each worm, and two concentric gears turnably mounted on said shaft, said pinions meshing with said gears.

12. In a reversible propeller, in combination, a propeller shaft, a propeller support on the shaft, propeller blades mounted in said support, said blades being disposed for turning about their longitudinal axes, each propeller blade having a gear and a worm for turning the same about its longitudinal axis, a pinion for each worm, two concentric gears turnably mounted on said shaft, said pinions meshing with said gears, and brake mechanism for each of said concentric gears for effecting relative movement between said gears and shaft, whereby the pitch of said propellers may be reversed.

13. In an adjustable blade propeller, a socket in which the propeller is mounted for rotation incident to adjustment, overlapping projections on the mounting and blade for limiting movement of the blade in a direction radial to the propeller, and a friction-developing body interposed between said projections, said body being supported in the direction of pressure of the blade and adapted to spread in a direction perpendicular to such pressure to frictionally lock the blade in the mounting.

14. In combination with a propeller having pitch adjustable blades, a shaft for rotating said propeller, and means for varying the pitch of said blades including a pair of brake drums operatively connected to said shaft and blades, brake shoes for holding said drums against rotation, and fluid pressure means for moving said shoes into engagement with said drums.

15. In combination with a propeller having a pitch adjustable blade, a shaft for rotating said propeller, means for adjusting the pitch of said blade during rotation of said propeller, and means independent of said pitch-adjusting means and automatically operable for positively gripping said blade about its perimeter to hold said blade in adjusted position.

16. An adjustable pitch propeller comprising a hub; a blade mounted thereon for movement to adjust its pitch angle; and means operable while the propeller is in motion for tightly gripping said blade to secure it rigidly to said hub.

17. In combination with a propeller having a hub, a plurality of propeller blades rotatably mounted in said hub, a shaft for driving said hub, means for adjusting the pitch of said blades during operation of the propeller, and means for gripping said blades and holding them in adjusted position, said last named means including members surrounding the blades.

18. In a variable pitch propeller having a plurality of pitch-adjustable blades, a shaft for driving said propeller, means for adjusting the pitch of the blades of the propeller, and operator-controlled means operable while the propeller is in motion for gripping the blades about their root ends to maintain the blades in adjusted pitch position.

19. In combination with a propeller having a plurality of pitch-adjustable blades, a shaft for rotating said propeller, means for adjusting the pitch of said blades during rotation of the propeller, and operator-controlled means independent of said pitch-adjusting means for gripping the blades adjacent their root ends to maintain the said blades at a desired pitch position.

RALPH WISHON.